Aug. 3, 1926.
F. A. BALLOU, JR
1,595,055
SEPARABLE BUTTON
Filed Oct. 26, 1925
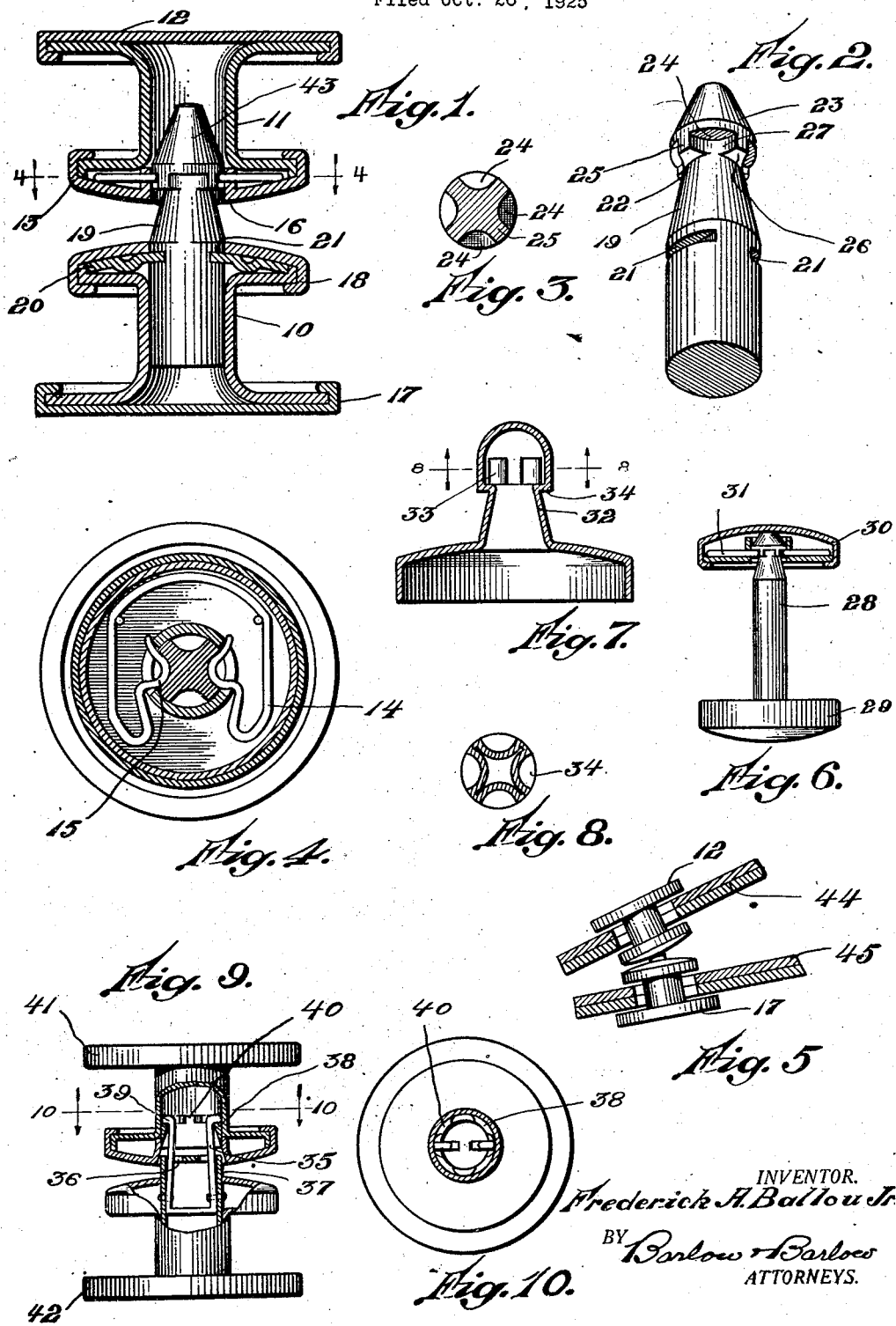
INVENTOR.
Frederick A. Ballou Jr.
BY Barlow & Barlow
ATTORNEYS.

Patented Aug. 3, 1926.

1,595,055

UNITED STATES PATENT OFFICE.

FREDERICK A. BALLOU, JR., OF PROVIDENCE, RHODE ISLAND, ASSIGNOR TO B. A. BALLOU AND CO., INC., OF PROVIDENCE, RHODE ISLAND, A CORPORATION OF RHODE ISLAND.

SEPARABLE BUTTON.

Application filed October 26, 1925. Serial No. 64,755.

This invention relates to an improved construction of stud and socket members which may be employed in separable cuff buttons or for other purposes for which these members are adapted to be used; and the object of this invention is to provide such stud and socket members which may be snapped by axial movement into engagement irrespective of their relatively rotative position about their axes and which may be separated by a relative rotative and axial movements of the members.

A further object of this invention is to construct the stud member with an annular reduced neck portion which cooperates with the adjacent larger portion of the stud to form a shoulder abutment and to provide means adjacent the shoulder to assist in releasing the socket member from engagement with the shoulders by a relative rotation of the stud and socket members.

A still further object of the invention is to form the reduced annular neck portion on a taper so that when this tapered portion is engaged by resilient engaging members of the socket they will be carried into engagement with the abutment shoulder of the stud.

A still further object of the invention is to position the spring engaging member in the socket member adjacent the entering edge thereof and to form the ribs on the stud to extend back from the shoulder a distance just short of the inner edge of the socket wall thereby permitting the socket member to tilt or swing into the reduced neck portion of the stud at the ends of the ribs upon rocking the stud and socket members at an angle relative to each other.

With these and other objects in view, the invention consists of certain novel features of construction, as will be more fully described, and particularly pointed out in the appended claims.

In the accompanying drawings:

Figure 1 is a sectional side elevation illustrating my improved construction of stud and socket members as applied to separable cuff buttons.

Figure 2 is a perspective view of my improved form of stud member having a reduced annular neck portion.

Figure 3 is a section of the stud on line 4—4 of Figure 1 through the reduced neck portion and the ribs adjacent the shoulder of the stud.

Figure 4 is a sectional view on line 4—4 of Figure 1, looking in the direction of the arrows and illustrating the spring arms in the socket member as having entered spaces between the ribs of the stud member.

Figure 5 shows the members of the button as swung at an angle to each other to conform to the inclined faces of the cuff to which they are attached.

Figure 6 is a modification showing a button which is formed with but two heads one being removable from the outer end of the stud portion.

Figure 7 is a modification illustrating the stud member as being drawn up from sheet stock and pressed or swaged to provide an annular reduced neck and the ribs on this neck.

Figure 8 is a section on line 8—8 of Figure 7, through the head of the stud.

Figure 9 is another modification illustrating the spring means in the stud as extending through an opening and spreading outwardly to engage the shoulder in the opening of the socket member.

Figure 10 is a section on line 10—10 of Figure 9.

It is found in the practical construction and operation of stud and socket members which may be employed in separable cuff buttons or for other purposes or devices in which they are adapted to operate, of advantage to form the stud member with a reduced annular neck portion which will cooperate with the adjacent larger portion of the stud to form a shoulder and to provide on this stud portion short ribs extending back from said shoulder to serve as a convenient means for lifting or releasably operating the engaging portions of the socket member so that the stud and socket members may be readily withdrawn from each other upon a relative rotation and axial movement of the same. It is also found of advantage to taper the annular reduced shank portion of the stud so that the resilient engaging elements of the socket member will have a tendency to advance into engagement with the shoulder formed on the stud and into position to be released upon relative rotation of the stud and socket members. Then again, it is found by forming a reduced neck portion on the stud that the socket member is permitted a relatively greater rocking action whereby the stud and socket members are permitted to tip and stand at a relatively greater angle to each other, to accommodate themselves to parts set at an angle to each other and particularly to accommodate themselves to the converging angles of cuff faces when these stud and socket members are employed in cuff buttons. Then again, by having an annular reduced neck portion beyond the relatively short ribs which are formed under the shoulder of the stud a continuous annular recess is provided into which the engaging members of the socket may snap irrespective of the relative rotative positions of the two members about their axes; and the following is a detailed description of the present embodiment of my invention showing means whereby these advantageous results may be accomplished:—

With reference to the drawings, 10 designates the stud member and 11 the socket member of my improved construction which are herein shown as formed for use as a separable cuff button. The socket member of this button is provided with an outer head 12 and an inner head 13. Located in this socket member there is resilient means 14, preferably in the form of a two-armed spring, as illustrated in Figure 4, which spring is provided with arcuately shaped portions or loops 15 shaped to engage the recesses in the stud projection, and I have shown this resilient or spring means as located adjacent the entering edge or face 16 of the socket member and in the separable cuff button form shown, is mounted in the inner head 13 thereof.

The stud member 10 of this button is provided with an outer head 17 and an inner head 18 and mounted in this stud member and held against relative rotative or axial movement is a projection, stud or post 19 which I have illustrated as securely held by means of a slotted plate 20 located in the inner head 18 of the button member and extending into slots 21 of the post.

This post or projection 19 is formed with an annular reduced neck portion 22, preferably tapering towards its free end and this reduced neck portion forms with its adjacent portion 23 of greater diameter, an abutment 24, set substantially at right angles to the axis of the post.

Adjacent the abutment 24 and extending substantially radially from the lower portion of the neck are ribs 25, which extend longitudinally of the post and back for a portion only of the length of the reduced neck, the inner ends 26 of these ribs providing a second series of abutments and their sides 27 forming means for engaging the resilient means or spring loops 15 for causing the same to flex or separate upon a relative rotation of the socket and the post, which causes these loops to ride up on the ribs 25 out of engagement with the abutment 24 permitting the stud and socket members to be freely withdrawn or separated one from the other.

It will also be noted that the ribs do not extend beyond the entering edge of the socket member and thus do not obstruct but permit a free relative rocking movement of the stud and socket members.

In Figure 6, I have illustrated the stud and socket members in the form of a shirt stud having an ornamental head 29, a projection or post 28 and an attaching or securing head 30 with resilient means 31 for engaging abutments adjacent the end of the stud which are similar to those above described.

Figure 7 illustrates the inner head of the stud member of the cuff button drawn from sheet metal to form a hollow stud 32 into which are swaged or pressed recesses 33 similar in shape to those of the stud illustrated in Figure 2, and forming abutments 34 for engagement with the resilient means, while in Figure 9 I have illustrated the substantial inverse of the foregoing constructions in which the resilient means are illustrated as a pair of spring fingers 35 extending through guiding opening 36 in the end of the tubular shank 37 of one of the members, while within the tubular opposite member abutments 38 are provided over which the outturned ends 39 of these fingers may be snapped and these fingers may be released from the abutments by engagement with projections 40, whereby a relative rotating movement of the stud and socket members 41 and 42 causes these fingers to be compressed inwardly by these projections and permit an axial movement to disengage the bottom members 41 and 42 from each other.

It will be noted that the tapered end 43 of the post and the tapered neck 22 cooperate to permit a relatively greater rocking movement of the two button members inasmuch as the inner edge of the socket member may swing a substantial distance into this reduced neck portion, which permits the heads of the button members when disposed in a cuff, as illustrated in Figure 5, to align with the cuff portions 44 and 45 and the axes of the button members to be disposed at an angle to each other.

It will be apparent that the stud and socket members as heretofore described may be utilized for separable cuff buttons of the type herein shown or that these members may be variously otherwise utilized wherever a quick snapping and locking or a quick detaching and releasing action is desired, which latter is obtained by a relative rotative movement of the parts.

By the term "socket member" as used in the claims, I mean any member having an opening of a size and shape to receive the stud member.

And further such a construction may be used where the rocking action is desired or where the axes of the stud and socket members is out of alignment.

The foregoing description is directed solely towards the construction illustrated, but I desire it to be understood that I reserve the privilege of resorting to all the mechanical changes to which the device is susceptible, the invention being defined and limited only by the terms of the appended claims.

In my copending applications Serial Numbers 29,634 and 37,149 maturing even date herewith, I have broader and more generic claims to this invention.

I claim:

1. A stud member having a substantially annular reduced neck portion cooperating with the adjacent larger portion of the stud to form a shoulder, a socket member to receive the stud, resilient shoulder engaging means carried by said socket member, and a rib at said shoulder for causing said engaging means to be withdrawn from engagement with the shoulder by a relative rotation of the stud and socket members.

2. A stud member having a substantially annular reduced neck portion cooperating with the adjacent larger portion of the stud to form a shoulder, a socket member to receive the stud, spring means carried by said socket member for releasably engaging said shoulder and ribs on the stud extending from said shoulder back a short distance along said neck portion providing means for causing said spring to be moved from engagement with said shoulder by a relative rotation of said stud and socket members.

3. A stud member having a substantially annular reduced neck portion cooperating with the adjacent larger portion of the stud to form a shoulder, a stud receiving socket member having a resilient shoulder engaging member located adjacent its entering edge portion, ribs on the stud extending back from said shoulder short of the inner edge of said socket permitting the end wall of the socket member to swing into said reduced neck portion at the ends of the ribs upon rocking said members at an angle to each other, said ribs serving to lift the spring from engagement with said shoulder by a relative rotation of said members.

4. A separable button comprising stud and socket members, resilient means carried by one of said members, a reduced substantially annular neck portion in the other of said members forming with its adjacent larger portion a shoulder abutment to be engaged by said resilient means, and means adjacent said abutment for causing said resilient means to flex and disengage said abutment upon a relative rotative movement of said members.

5. A separable button comprising stud and socket members, resilient means carried by said socket member, said stud member having a projection with a reduced neck forming with its adjacent larger portion a shoulder abutment, rib portions integral with said projection and located in said neck adjacent said abutment and extending but a portion only of the length of said neck to form at their ends other abutments staggered relatively to the first of said abutments and also having their sides forming guides by which said resilient means may be flexed by a relative rotative movement to disengage said first abutments and permit a separation of said members.

6. In a separable button comprising stud and socket members, the stud member having a projection with a tapered annular neck portion, resilient means carried by the socket member for causing a relative axial movement of said members upon engaging said tapered neck portion.

7. A separable button comprising a stud member having a projection with a tapered annular neck portion forming with the adjacent larger portion a shoulder abutment, a socket member to receive said projection, and resilient means carried by said socket member for causing a relative movement of said members upon engaging said tapered neck portion to cause said resilient means to engage said abutment.

8. A separable cuff button comprising stud and socket members, each having inner and outer heads, resilient means carried by the inner head of the socket member, a projection on said stud member to extend into said socket member and having an annular reduced neck portion of extended length forming with its larger portion an abutment to be engaged by said resilient means, said reduced neck portion permitting the inner head of said socket member to swing thereinto to obtain a relative rocking movement of said member whereby their heads may conform to the planes of the cuff in which they are mounted.

In testimony whereof I affix my signature.

FREDERICK A. BALLOU, Jr.